US011416639B2

(12) United States Patent
Tanami et al.

(10) Patent No.: US 11,416,639 B2
(45) Date of Patent: Aug. 16, 2022

(54) PQA UNLOCK

(71) Applicant: NUVOTON TECHNOLOGY CORPORATION, Hsin-chu (TW)

(72) Inventors: Oren Tanami, Ra'anana (IL); Ziv Hershman, Givat Shmuel (IL)

(73) Assignee: NUVOTON TECHNOLOGY CORPORATION, Hsin-Chu (TW)

(*) Notice: Subject to any disclaimer, the term of this patent is extended or adjusted under 35 U.S.C. 154(b) by 187 days.

(21) Appl. No.: 16/914,535

(22) Filed: Jun. 29, 2020

(65) Prior Publication Data

US 2021/0406405 A1 Dec. 30, 2021

(51) Int. Cl.
*G06F 21/72* (2013.01)
*H04L 9/08* (2006.01)

(52) U.S. Cl.
CPC ............ *G06F 21/72* (2013.01); *H04L 9/0825* (2013.01); *H04L 9/0877* (2013.01); *H04L 2209/12* (2013.01)

(58) Field of Classification Search
CPC ..... G06F 21/72; H04L 9/0825; H04L 9/0877; H04L 2209/12
USPC .......................................................... 713/189
See application file for complete search history.

(56) References Cited

U.S. PATENT DOCUMENTS 8,332,641 B2 * 12/2012 Case ................... G06F 11/3656 713/168
8,631,247 B2 * 1/2014 O'Loughlin ........... G06F 21/73 726/28
8,732,468 B2 * 5/2014 Roy ........................ G06F 21/70 726/32
8,966,657 B2 * 2/2015 Martinez ................ H04L 63/06 726/30
8,977,864 B2 * 3/2015 Kocher ................. H04L 9/3271 713/189
9,430,658 B2 * 8/2016 Covey .................. G06F 9/4401
2010/0199077 A1 * 8/2010 Case .................. G06F 11/3656 713/1
2010/0284539 A1 11/2010 Roy et al.
2010/0287374 A1 11/2010 Roy et al.

(Continued)

FOREIGN PATENT DOCUMENTS

EP 3407242 A1 11/2018

OTHER PUBLICATIONS

U.S. Appl. No. 17/331,665 Office Action dated Jun. 29, 2022.

*Primary Examiner* — Samson B Lemma
(74) *Attorney, Agent, or Firm* — Kligler & Associates Patent Attorneys Ltd

(57) ABSTRACT

In one embodiment, a secure chip apparatus, includes a memory to store an encrypted value E and a one-way function output-value H, which is an output value of a one-way function computed with a nonce N as input, an interface to transfer data with an external device, and chip security circuitry to lock a portion of the chip apparatus from use, receive an unlock request from an unlocking hardware security module (HSM) via the interface, provide the encrypted value E to the HSM responsively to the unlock request, receive a value N' from the HSM, the value N' being a decrypted value of the encrypted value E, compute a one-way function output-value H' responsively to the value N', compare the value H' to the value H, and unlock the portion of the chip apparatus for use responsively to a match between the value H' and the value H.

20 Claims, 10 Drawing Sheets

(56) References Cited

U.S. PATENT DOCUMENTS

| | | | | |
|---|---|---|---|---|
| 2012/0250429 | A1 | 10/2012 | Tailliet et al. | |
| 2014/0093074 | A1 | 4/2014 | Gotze et al. | |
| 2014/0164779 | A1* | 6/2014 | Hartley | H04L 9/0866 713/176 |
| 2016/0171223 | A1* | 6/2016 | Covey | G06F 21/572 713/189 |
| 2017/0180131 | A1 | 6/2017 | Ghosh et al. | |
| 2018/0097803 | A1 | 4/2018 | Iwanir et al. | |
| 2018/0337776 | A1* | 11/2018 | Miller | G06F 21/79 |
| 2019/0245702 | A1* | 8/2019 | Ben Simon | H04L 9/3247 |
| 2020/0344075 | A1 | 10/2020 | Gremaud et al. | |

* cited by examiner

PQA UNLOCK

FIELD OF THE INVENTION

The present invention relates to integrated circuit chips, and in particular, but not exclusively, to chip unlock.

BACKGROUND

The high cost of integrated circuit (IC) fabrication has led many to outsource IC chip fabrication to third parties. Research has shown that outsourcing may lead to various risks, such as security risks (e.g., tampering with the devices including adding malicious hardware modules to the chips), illegally producing the chips for others, and in some cases stealing the IC chip design. Various measures have been introduced to mitigate these risks.

For example, the risks may be mitigated by using layout camouflaging, which alter the appearance of a chip in order to obfuscates the design information of the IC chip.

By way of another example, logic locking may be used to supplement an existing chip design with dedicated locking circuitry, which is closely intertwined with existing cells and affects IC functionality through a key, which is held by the chip vendor or chip owner e.g., chip designer or IP-rights owner. If the correct key is provided, the IC chip, or part thereof, unlocks and is ready for use. Therefore, the chip can only be unlocked by the chip owner or vendor.

Other reasons exist for locking chips. For example, in some applications, a debug interface of a chip may be locked to prevent access to the debug interface by customers and other third parties. The chip owner or vendor may have the ability to securely unlock the debug interface to process a customer return of the chip or to test the chip as part of post-production quality assurance.

One example of logic locking is described in US Patent Publication 2010/0287374 of Roy, et al., which describes techniques to lock and unlock an integrated circuit (IC) based device by encrypting/decrypting a bus on the device. The bus may be a system bus for the IC, a bus within the IC, or an external input/output bus. A shared secret protocol is used between an IC designer and a fabrication facility building the IC. The IC at the fabrication facility scrambles the bus on the IC using an encryption key generated from unique identification data received from the IC designer. With the IC bus locked by the encryption key, only the IC designer may be able to determine and communicate the appropriate activation key required to unlock (e.g., unscramble) the bus and thus make the integrated circuit usable.

US Patent Publication 2010/0284539 of Roy, et al., describes techniques for reducing the likelihood of piracy of integrated circuit design using combinational circuit locking system and activation protocol based on public-key cryptography. Every integrated circuit is to be activated with an external key, which can only be generated by an authenticator, such as the circuit designer. During circuit design, register transfer level (RTL) descriptions of the IC design are embedded with combinational logic based on a master key applied by the authenticator. That combinational logic renders at least one module of the RTL description locked, i.e., encrypted. The completed circuit design from the authenticator is sent to a fabrication lab with the combinational-logic-locked modules. After fabrication, the circuit can only be activated when the authenticator sends an appropriate key that is used by the circuit to unlock the locked portions and thereby activate the circuit.

US Patent Application 2017/0180131 of Ghosh, et al., describes a system and techniques for secure unlock to access debug hardware. A cryptographic key may be received at a hardware debug access port of a device. A digest may be computed from the cryptographic key at an unlock unit of the device. A fuse value may be received from a non-volatile read-only storage on the device. The digest and the fuse value may be compared to determine whether they are the same. A pass-fail pulse may be provided that indicates the result of the comparing.

U.S. Pat. No. 8,332,641 to Case, et al., describes an integrated circuit (IC) device, which under the direction of a first party, is configured to temporarily enable access to a debug interface of the IC device via authentication of the first party by a challenge/response process using a key of the IC device and a challenge value generated at the IC device. The first party then may conduct a software evaluation of the IC device via the debug interface. In response to failing to identify an issue with the IC device from the software evaluation, the first party can permanently enable open access to the debug interface while authenticated and provide the IC device to a second party. Under the direction of the second party, a hardware evaluation of the IC device is conducted via the debug interface that was permanently opened by the first party.

SUMMARY

There is provided in accordance with still another embodiment of the present disclosure, a secure integrated circuit (IC) chip apparatus, including a memory configured to store an encrypted value E of a nonce N and a one-way function output-value H, which is an output value of a one-way function computed with the nonce N as input, an interface configured to transfer data with an external device, and chip security circuitry configured to lock a portion of the IC chip apparatus from use, receive an unlock request from an unlocking hardware security module (HSM) via the interface, provide the encrypted value E to the HSM via the interface responsively to the unlock request, receive a value N' from the HSM, the value N' being a decrypted value of the encrypted value E, compute a one-way function output-value H' responsively to the value N', compare the one-way function output-value H' to the one-way function output-value H, and unlock the portion of the IC chip apparatus for use responsively to a match between the value H' and the value H.

Further in accordance with an embodiment of the present disclosure, the apparatus includes a random number generator to generate the nonce N, the chip security circuitry being configured to provide the nonce N to a security-setup HSM, receive the encrypted value E and the one-way function output-value H from the security-setup HSM, and delete the nonce N.

Still further in accordance with an embodiment of the present disclosure, the apparatus includes a random number generator to generate the nonce N, the chip security circuitry being configured to compute the one-way function output-value H responsively to the nonce N, provide the nonce N to a security-setup HSM, receive the encrypted value E from the security-setup HSM, and delete the nonce N.

Additionally in accordance with an embodiment of the present disclosure, the apparatus includes a random number generator to generate the nonce N, the chip security circuitry being configured to encrypt the nonce N yielding the encrypted value E, compute the one-way function output-value H responsively to the nonce N, and delete the nonce N.

Moreover, in accordance with an embodiment of the present disclosure the chip security circuitry is configured to receive the encrypted value E and the one-way function output-value H from a security-setup HSM.

Further in accordance with an embodiment of the present disclosure the portion of the IC chip apparatus includes a debug interface.

There is also provided in accordance with another embodiment of the present disclosure, a secure integrated circuit (IC) chip method, including performing a chip-security setup process, including storing an encrypted value E of a nonce N and a one-way function output-value H, which is an output value of a one-way function computed with the nonce N as input, in a memory of an IC chip apparatus, and locking a portion of the IC chip apparatus from use, and performing an unlock process by the IC chip apparatus, including receiving an unlock request from an unlocking hardware security module (HSM) via an interface, providing the encrypted value E to the HSM via the interface responsively to the unlock request, receiving a value N' from the HSM, the value N' being a decrypted value of the encrypted value E, computing a one-way function output-value H' responsively to the value N', comparing the one-way function output-value H' to the one-way function output-value H, and unlocking the portion of the IC chip apparatus for use responsively to a match between the value H' and the value H.

Still further in accordance with an embodiment of the present disclosure the chip-security setup process further includes the IC chip apparatus randomly generating the nonce N, providing the nonce N to a security-setup HSM, receiving the encrypted value E and the one-way function output-value H from the security-setup HSM, and deleting the nonce N.

Additionally in accordance with an embodiment of the present disclosure the chip-security setup process further includes the IC chip apparatus randomly generating the nonce N, computing the one-way function output-value H responsively to the nonce N, providing the nonce N to a security-setup HSM, receiving the encrypted value E from the security-setup HSM, and deleting the nonce N.

Moreover, in accordance with an embodiment of the present disclosure the chip-security setup process further includes the IC chip apparatus randomly generating the nonce N, encrypting the nonce N yielding the encrypted value E, computing the one-way function output-value H responsively to the nonce N, and deleting the nonce N.

Further in accordance with an embodiment of the present disclosure the chip-security setup process further includes the IC chip apparatus receiving the encrypted value E and the one-way function output-value H from a security-setup HSM.

There is also provided in accordance with still another embodiment of the present disclosure, a secure integrated circuit (IC) chip method, including performing a chip-security setup process, including storing an encrypted value E and a one-way function output-value H, which is an output value of a one-way function computed with a nonce N as input, in a memory of an IC chip apparatus, and locking a portion of the IC chip apparatus from use, and performing an unlock process, including generating an unlock request by an unlocking hardware security module (HSM), providing, by the IC chip apparatus, the stored encrypted value E to the HSM responsively to the unlock request, decrypting the encrypted value E by the HSM yielding a value N', providing, by the HSM, the value N' to the IC chip apparatus, computing, by the IC chip apparatus, a one-way function output-value H' responsively to the value N', comparing, by the IC chip apparatus, the one-way function output-value H' to the stored one-way function output-value H, and unlocking, by the IC chip apparatus, the portion of the IC chip apparatus for use, responsively to a match between the value H' and the value H.

Still further in accordance with an embodiment of the present disclosure the chip-security setup process further includes randomly generating the nonce N by the IC chip apparatus, providing, by the IC chip apparatus, the nonce N to a security-setup HSM, encrypting the nonce N and computing the one-way function with the nonce N as input by the security-setup HSM yielding the encrypted value E and the one-way function output-value H, respectively, providing the encrypted value E and the one-way function output-value H to the IC chip apparatus, and deleting the nonce N from the IC chip apparatus.

Additionally, in accordance with an embodiment of the present disclosure the encrypting includes encrypting the nonce N responsively to a public key of the unlocking HSM, and the decrypting includes decrypting the encrypted value E responsively to a private key of the unlocking HSM.

Moreover in accordance with an embodiment of the present disclosure the chip-security setup process further includes randomly generating the nonce N by the IC chip apparatus, computing, by the IC chip apparatus, the one-way function output-value H responsively to the nonce N, providing, by the IC chip apparatus, the nonce N to a security-setup HSM, encrypting the nonce N by the security-setup HSM yielding the encrypted value E, providing the encrypted value E to the IC chip apparatus, and deleting the nonce N from the IC chip apparatus.

Further in accordance with an embodiment of the present disclosure the encrypting includes encrypting the nonce N responsively to a public key of the unlocking HSM, and the decrypting includes decrypting the encrypted value E responsively to a private key of the unlocking HSM.

Still further in accordance with an embodiment of the present disclosure the chip-security setup process further includes encrypting the nonce N and computing the one-way function with the nonce N as input by a security-setup HSM yielding the encrypted value E and the one-way function output-value H, respectively, and providing the encrypted value E and the one-way function output-value H to the IC chip apparatus.

Additionally, in accordance with an embodiment of the present disclosure the encrypting includes encrypting the nonce N responsively to a public key of the unlocking HSM, and the decrypting includes decrypting the encrypted value E responsively to a private key of the unlocking HSM.

Moreover in accordance with an embodiment of the present disclosure the chip-security setup process further includes performing by the IC chip apparatus randomly generating the nonce N by the IC chip apparatus, encrypting the nonce N yielding the encrypted value E, computing the one-way function with the nonce N as input yielding the one-way function output-value H, and deleting the nonce N from the IC chip apparatus.

Further in accordance with an embodiment of the present disclosure the encrypting includes encrypting the nonce N responsively to a public key of the unlocking HSM, and the decrypting includes decrypting the encrypted value E responsively to a private key of the unlocking HSM.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
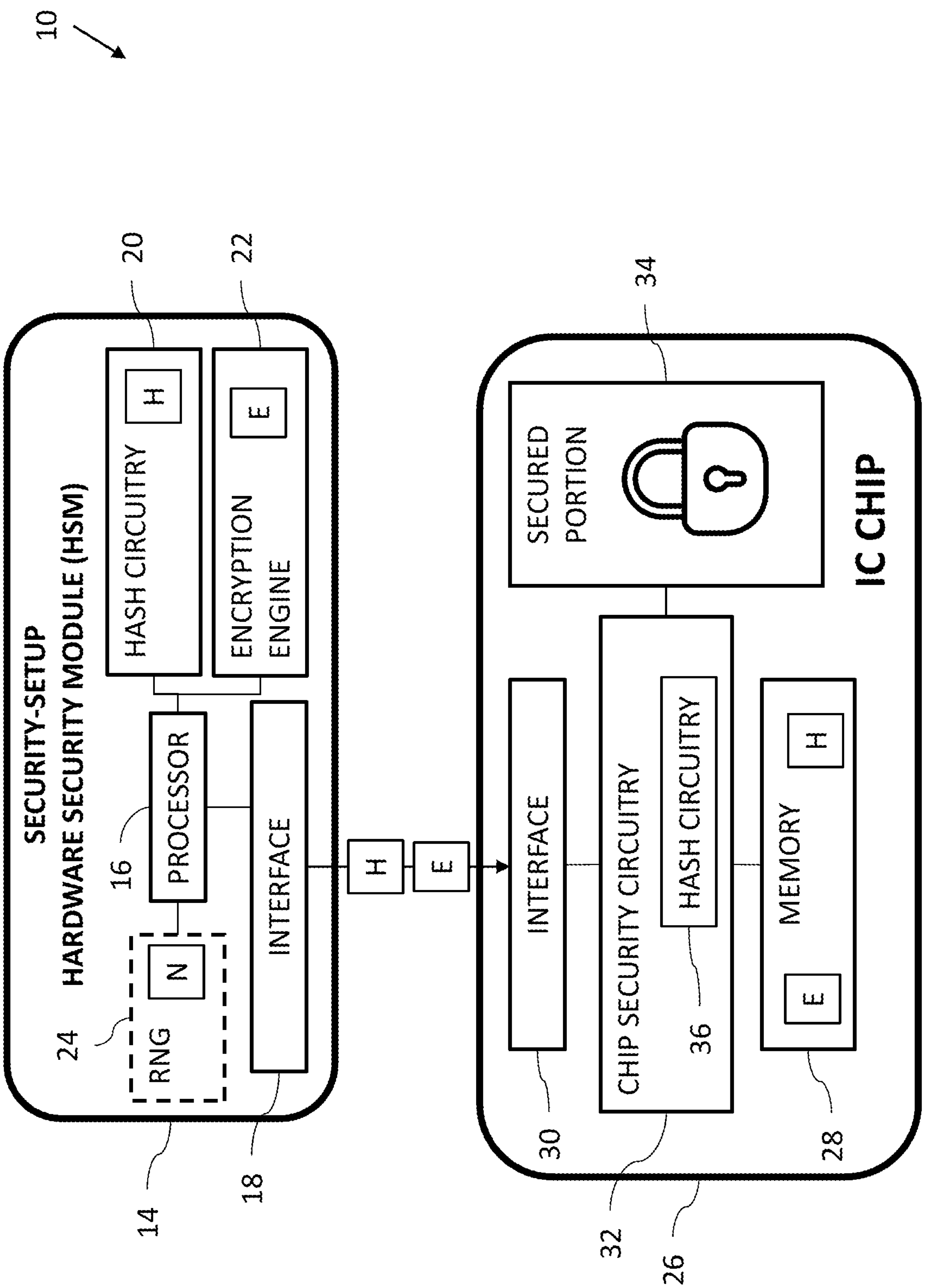
FIG. 1 is a block diagram view illustrating part of an integrated circuit (IC) chip security setup system constructed and operative in accordance with an embodiment of the present invention.

As previously mentioned, logic locking may be used to supplement an existing chip design with dedicated locking circuitry, which is closely intertwined with existing cells and affects the IC functionality through a key, which is held by the chip owner. If the correct key is provided, the IC, or part thereof, unlocks and can be used.

The success of providing locking logic, which is unlocked using a secret key, rides on the security of the secret key. If the IC chip stores the secret key, the security of the locking logic may be comprised by a hacker who searches for the secret key.

One solution to the above problem is not to store the secret key, but to store a value which is a function of the secret key. The IC chip may then be supplied with the secret key which is then processed by the function yielding a result which is compared with the stored value. If the result and stored value match, the IC chip logic may be unlocked.

The above solution either requires the chip owner or vendor (e.g., designer or IP-rights owner) to use the same secret key for all the IC chips or to use a lookup table which links IC chips (e.g., via chip IDs) to the respective secret keys of the IC chips. Having the same secret key across all chips is a potential security risk as once the key is known all the chips may be illicitly unlocked. Maintaining a lookup table may be cumbersome, and pose its own security risks.

Embodiments of the present invention solve the above problems, by storing two values on each IC chip. One value is a cryptographic hash value H of a nonce N, and the other value is an encrypted value E of the nonce N. The encrypted value E may be encrypted based on a key (based on symmetric or asymmetric encryption) held by the IC chip owner or vendor. In some embodiments, the values E and H may be added to each chip during production, for example, by a security-setup hardware security module (HSM) of the IC chip owner. In some embodiments, the nonce N may be supplied to the HSM by each chip. In other embodiments, the hash value H and/or the encrypted value E may be computed by each chip, for example, when the IC chip receives an unlock request. The chip, or portion thereof, remains locked until a value matching the nonce N is supplied to the chip, as described in more detail below.

The chip may be unlocked for general use or a specific use, such as debugging or to test the chip as part of post-production quality assurance. In some embodiments, before the chip is shipped to customers, the chip may be relocked for some purposes, e.g., debugging, but unlocked for other general use of the chip. If the chip is return by a customer to the chip vendor, the chip vendor may unlock the chip, e.g., for debugging. Once the chip has been unlocked the chip may relock automatically after a certain timeout or the chip may need to be manually relocked by the HSM.

In some embodiments, performing a cryptographic hash on a nonce yielding a cryptographic hash value H may be replaced by computing a one-way function (not necessarily a cryptographic hash function) with a nonce or other value as input yielding a one-way function output-value (not necessarily a hash value). When an unlocking hardware security module (HSM) of the IC chip owner requests an IC chip to unlock, that IC chip provides the respective encrypted value E to the HSM. The HSM decrypts the encrypted value E yielding a value N'. The value N' is passed by the HSM to the chip which performs a cryptographic hash of N' yielding H'. The hash value H' is compared to the stored hash value H, and if there is a match between H and H' the IC chip is unlocked.

In the above way, a chip may be unlocked based on a secret (e.g., nonce N) which is not directly stored in the chip, and without the HSM having to store the secret as the encrypted value E stored on the chip provides the secret in a secure manner to the unlocking HSM. Therefore, the chip provides self-contained security as the HSM does not need a lookup table which links IC chips (e.g., via chip IDs) to the respective secret keys of the IC chips.

The encrypted values and hash values stored in the IC chips are typically protected. The hash values are protected from tampering, as an attempt to change a hash value could lead to hacking of the respective IC chip. The encrypted values are generally protected from being erased or tampered with, as if the correct encrypted value is not available, the respective IC chip may prevent unlocking even to legitimate unlocking attempts.

Although the same nonce N may be used for each chip, security is enhanced by using a different, typically randomly generated, nonce N, for each chip. In this manner, each chip may be unlocked using a different secret, which is not stored on each respective chip, while the unlocking HSM does not need to store the secrets. The unlocking HSM simply stores the relevant decryption key to decrypt the different encrypted values E. In some embodiments, more than one chip may be secured based on the same nonce N.

In some embodiments, each nonce N is encrypted and decrypted using symmetric encryption and a common cryptographic key. In some embodiments, the key may be a function of some chip specific data such as the chip ID.

In other embodiments, asymmetric cryptography is used in which each nonce N is encrypted with the public key of the unlocking HSM, and decrypted by the unlocking HSM using its private key.

The terms "scrambled" and "encrypted", in all of their grammatical forms, are used interchangeably throughout the present specification and claims to refer to any appropriate scrambling and/or encryption methods for scrambling and/or encrypting data, and/or any other appropriate method for intending to make data unintelligible except to an intended recipient(s) thereof. Well known types of scrambling or encrypting include, but are not limited to DES, 3DES, RSA and AES. Similarly, the terms "descrambled" and "decrypted" are used throughout the present specification and claims, in all their grammatical forms, to refer to the reverse of "scrambled" and "encrypted" in all their grammatical forms.

System Description

As previously mentioned, each IC chip stores an encrypted value E and a cryptographic hash H which are used during unlocking of each respective IC chip. The descriptions below with reference to FIGS. 1-8 describe different embodiments to generate the values E and H for storing on the IC chips. The embodiments described with reference to FIGS. 1-6 use an external hardware security module (HSM) to generate the value E and optionally the value H. The embodiment described with reference to FIGS. 7 and 8 describes the IC chip generating the values E and H without the help of an external HSM. The description with reference to FIGS. 9 and 10 describes the unlock process which uses the values E and H which were previously stored on the IC chip.

Reference is now made to FIG. 1, which is a block diagram view illustrating part of an integrated circuit (IC) chip security setup system 10 constructed and operative in accordance with an embodiment of the present invention.

The IC chip security setup system 10 includes a security-setup hardware security module (HSM) 14, which is typically, but not necessarily, located at the chip manufacturer (not shown) and is generally suitably secured against tampering. The security-setup HSM 14 is generally maintained and operated by the IC chip vendor or owner (e.g., IC chip designer and/or IP-rights owner). The IC chip security setup system 10 may store one or more root keys that are used to generate keys and signs certificates for storing on the IC chips produced by the chip manufacturer. The security-setup HSM 14 includes a processor 16, an interface 18, hash circuitry 20 (or one-way function computation circuitry), an encryption engine 22, and a random number generator (RNG) 24. The processor 16 is configured to perform general processing tasks including managing transfer of data among the elements of the security-setup HSM 14 as well as between external devices via the interface 18. The interface 18 is configured to transfer data between external devices, e.g., IC chips, using any suitable wired and/or wireless communication protocol. In some embodiments, the functionality of one or more of: the hash circuitry 20, encryption engine 22, and random number generator 24, may be incorporated into the processor 16. In other embodiments, the hash circuitry 20, encryption engine 22, and random number generator 24 may be implemented using one or more suitable processing circuitry units which may be hard-wired and/or programmable devices.

In practice, some or all of the functions of the processor 16 may be combined in a single physical component or, alternatively, implemented using multiple physical components. These physical components may comprise hard-wired or programmable devices, or a combination of the two. In some embodiments, at least some of the functions of the processor 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

FIG. 1 shows a secure integrated circuit (IC) chip apparatus 26. The IC chip apparatus 26 includes a memory 28, an interface 30 configured to transfer data with an external device (e.g., the security-setup HSM 14), chip security circuitry 32, and a secured portion 34 of the IC chip apparatus 26. The interface 30 may be configured to transfer data with the security-setup HSM 14 via a wired and/or wireless communication protocol. In some embodiments, the interface 30 is an indirect interface comprising hardware and/or software layers to indirectly interface with the security-setup HSM 14. For example, external software (e.g., DLL) may communicate with the HSM 14 and perform security functions. The chip security circuitry 32 includes hash circuitry 36 (or one-way function computation circuitry) to compute cryptographic hashes. The secured portion 34 may comprise a debug interface (e.g., debug hardware), which may be unlocked during post-production testing and/or to process a customer return of the IC chip apparatus 26.

In practice, some or all of the functions of the chip security circuitry 32 may be combined in a single physical component or, alternatively, implemented using multiple physical components. These physical components may comprise hard-wired or programmable devices, or a combination of the two. In some embodiments, at least some of the functions of the chip security circuitry 32 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
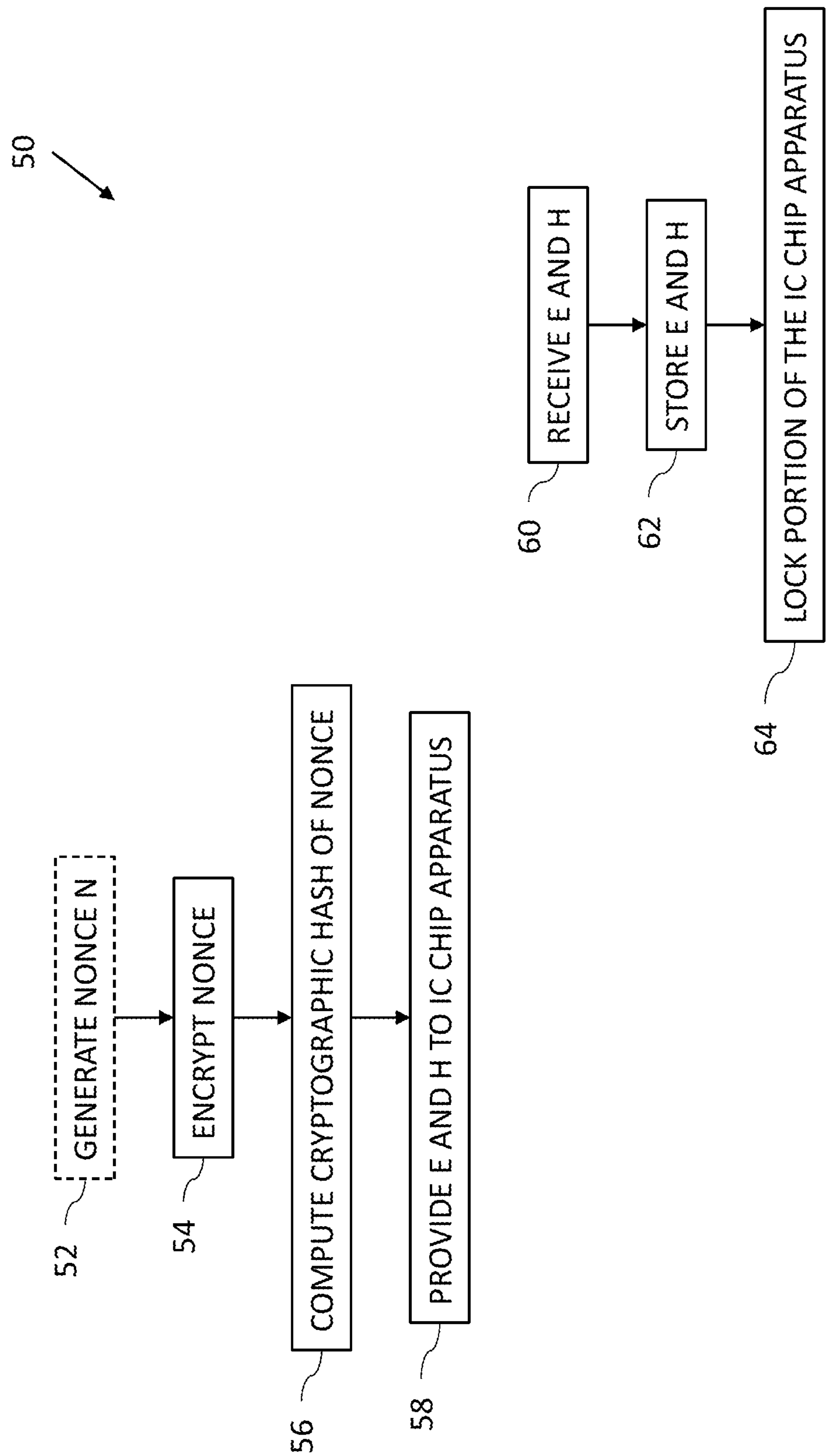
FIG. 2 is a flowchart including steps in a method of operation of the system of FIG. 1.

A chip-security setup process is now described with reference to FIGS. 1 and 2. FIG. 2 is a flowchart 50 including steps in a method of operation of the system 10 of FIG. 1. Steps performed by the security-setup HSM 14 are shown on the left side of FIG. 2, while steps performed by the IC chip apparatus 26 are shown on the right side of FIG. 2.

The random number generator 24 of the security-setup HSM 14 is configured to optionally randomly generate (block 52) a nonce N. The encryption engine 22 of the security-setup HSM 14 is configured to encrypt (block 54) the nonce N yielding an encrypted value E. In some embodiments, the encryption engine 22 is configured to encrypt the nonce N using symmetric encryption based on a secret key. In other embodiments, the encryption engine 22 is configured to encrypt the nonce N responsively to a public key of an unlocking HSM, described in more detail with reference to FIGS. 9 and 10.

The hash circuitry 20 of the security-setup HSM 14 is configured to compute (block 56) a cryptographic hash of the nonce N yielding a cryptographic hash value H. The hash circuitry 20 may use any suitable cryptographic hash algorithm, for example, but not limited to, MD5 or SHA-1, SHA-2, or SHA-3.

In some embodiments, performing a cryptographic hash on a nonce yielding a cryptographic hash value H may be replaced by computing a one-way function (not necessarily a cryptographic hash function) with a nonce or other value as input yielding a one-way function output-value (not necessarily a hash value).

The processor 16 of the security-setup HSM 14 is configured to provide (block 58) the encrypted value E and the cryptographic hash value H to the IC chip apparatus 26 via the interface 18 of the security-setup HSM 14. The chip security circuitry 32 of the IC chip apparatus 26 is configured to receive (block 60) the encrypted value E and the cryptographic hash value H from the interface 18 of the security-setup HSM 14 via the interface 30 of the IC chip apparatus 26. The memory 28 is configured to store (block 62) the encrypted value E and the cryptographic hash value H. Memory may include one-time programmable (OTP) memory or a non-volatile memory, e.g. flash memory, which is typically tamper resistant.

The chip security circuitry 32 is configured to lock (block 64) the secured portion 34 of the IC chip apparatus 26 from use. The chip security circuitry 32 may lock the secured portion 34 after performing the steps of blocks 52-62 or prior to the steps of blocks 52-64, for example, the IC chip apparatus 26 may be manufactured in a locked state. The term "unlock", as used in the specification and claims, is defined to include unlock for general use of the secured portion 34 or unlock for a specific use, such as, debugging. The term "lock", as used in the specification and claims, is defined as locking the secured portion 34 for all use or for specific usage such as debugging, whereas the other functions of the secured portion 34 may be unlocked for use even while the secured portion 34 is locked for the specific usage.

Figure 3:
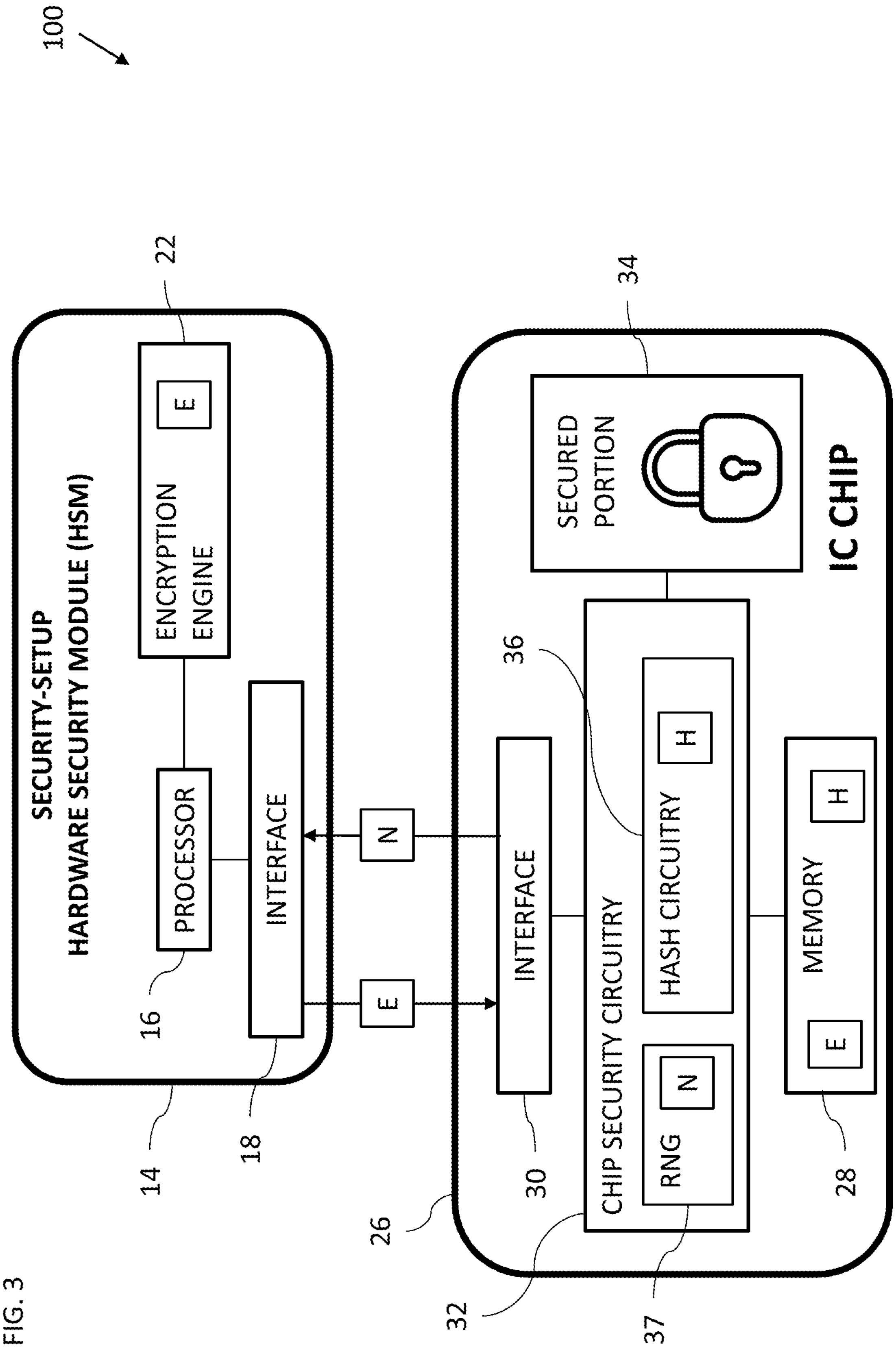
FIG. 3 is a block diagram view illustrating part of a first alternative integrated circuit (IC) chip security setup system constructed and operative in accordance with an embodiment of the present invention.
Figure 4:
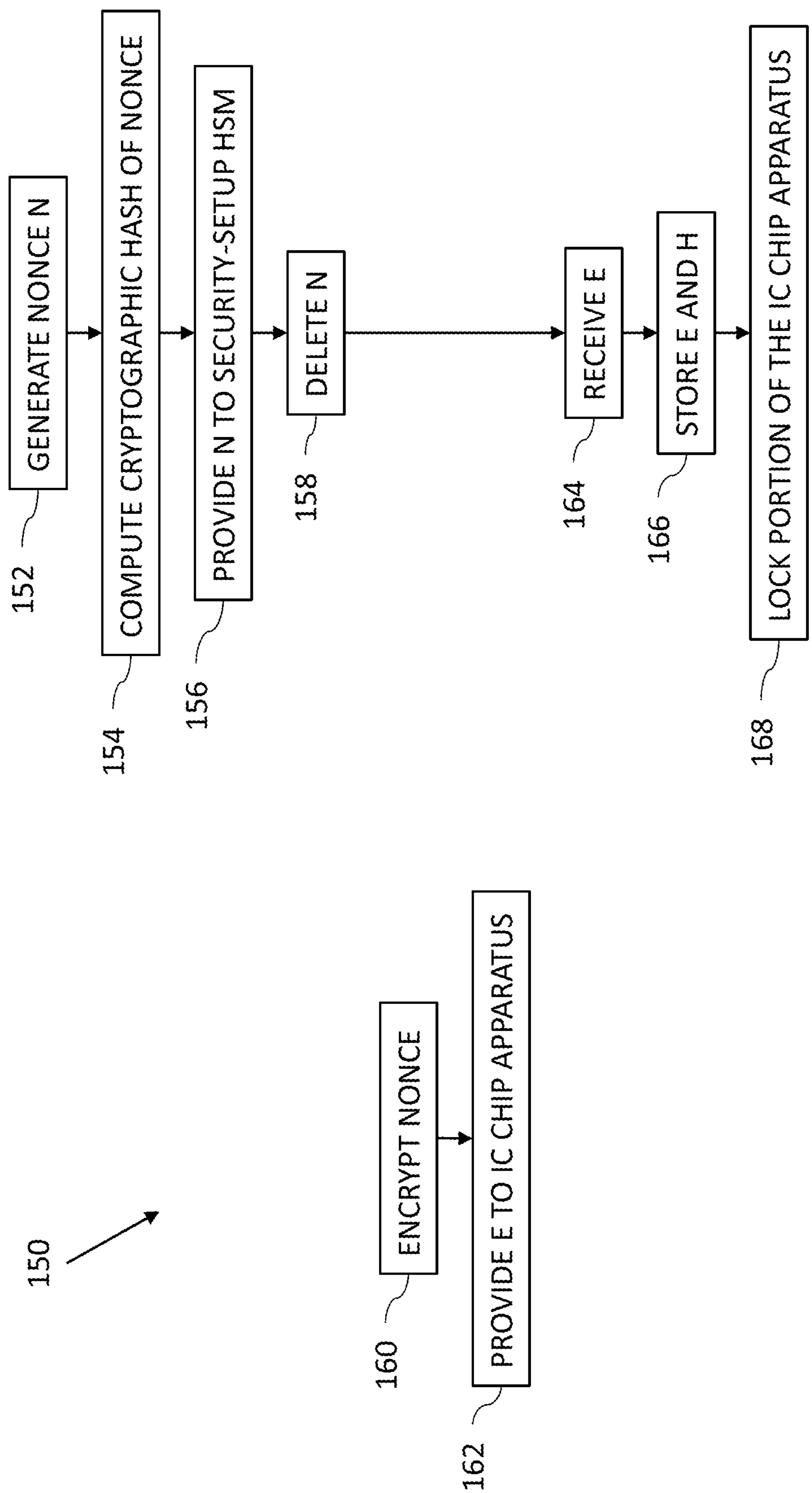
FIG. 4 is a flowchart including steps in a method of operation of the system of FIG. 3.

An alternative chip-security setup process is now described with reference to FIGS. 3 and 4. FIG. 3 is a block diagram view illustrating part of a first alternative integrated circuit (IC) chip security setup system 100 constructed and operative in accordance with an embodiment of the present invention. FIG. 4 is a flowchart 150 including steps in a method of operation of the system 100 of FIG. 3. The system 100 is substantially the same as the IC chip security setup system 10 (FIG. 1) except for the following differences.

Steps performed by the security-setup HSM 14 are shown on the left side of FIG. 4, while steps performed by the IC chip apparatus 26 are shown on the right side of FIG. 4. The chip security circuitry 32 of the IC chip apparatus 26 of FIG. 3 also includes a random number generator 37.

The random number generator 37 of the IC chip apparatus 26 is configured to randomly generate (block 152) a nonce N. The hash circuitry 36 of the IC chip apparatus 26 is configured to compute (block 154) a cryptographic hash value H responsively to the nonce N. The hash circuitry 36 may use any suitable cryptographic hash algorithm, for example, but not limited to, MD5 or SHA-1, SHA-2, or SHA-3.

The chip security circuitry 32 of the IC chip apparatus 26 is configured to provide (block 156) the nonce N to the interface 18 of the security-setup HSM 14 via the interface 30 of the IC chip apparatus 26. The chip security circuitry 32 is configured to delete (erase) (block 158) the nonce N from memory (e.g., from the memory 28 and any cache memory).

The encryption engine 22 of security-setup HSM 14 is configured to encrypt (block 160) the nonce N yielding an encrypted value E. In some embodiments, the encryption engine 22 is configured to encrypt the nonce N using symmetric encryption based on a secret key. In other embodiments, the encryption engine 22 is configured to encrypt the nonce N responsively to a public key of an unlocking HSM, described in more detail with reference to FIGS. 9 and 10.

The processor 16 of the security-setup HSM 14 is configured to provide (block 162) the encrypted value E to the IC chip apparatus 26 via the interface 18 of the security-setup HSM 14. The chip security circuitry 32 of the IC chip apparatus 26 is configured to receive (block 164) the encrypted value E from the interface 18 of the security-setup HSM 14 via the interface 30 of the IC chip apparatus 26.

The memory 28 is configured to store (block 166) the encrypted value E and the cryptographic hash value H. The chip security circuitry 32 is configured to lock (block 168) the secured portion 34 of the IC chip apparatus 26 from use. The chip security circuitry 32 may lock the secured portion 34 after performing the steps of blocks 152-166 or prior to the steps of blocks 152-166, for example, the IC chip apparatus 26 may be manufactured in a locked state.

Figure 5:
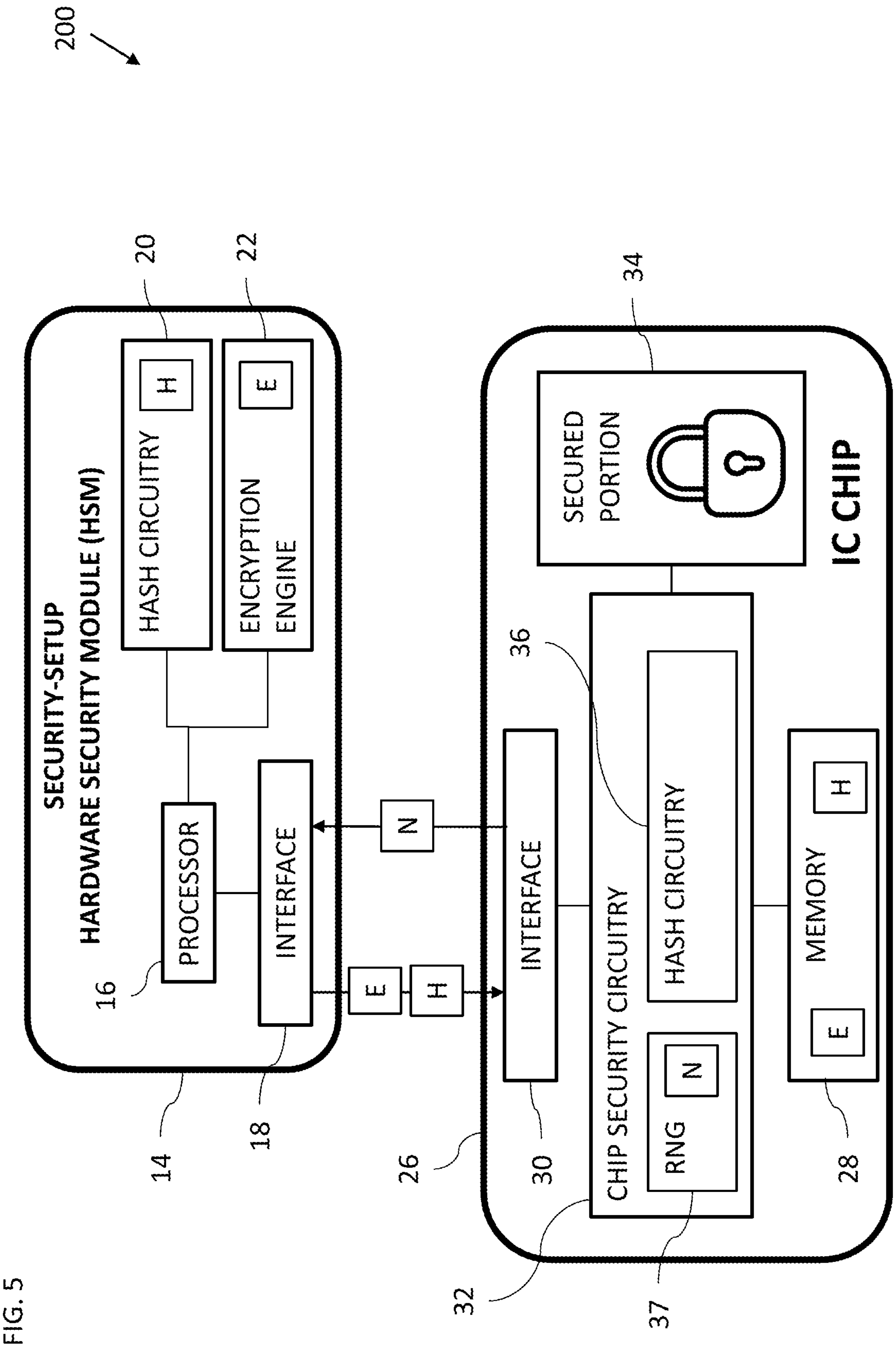
FIG. 5 is a block diagram view illustrating part of a second alternative integrated circuit (IC) chip security setup system constructed and operative in accordance with an embodiment of the present invention.
Figure 6:
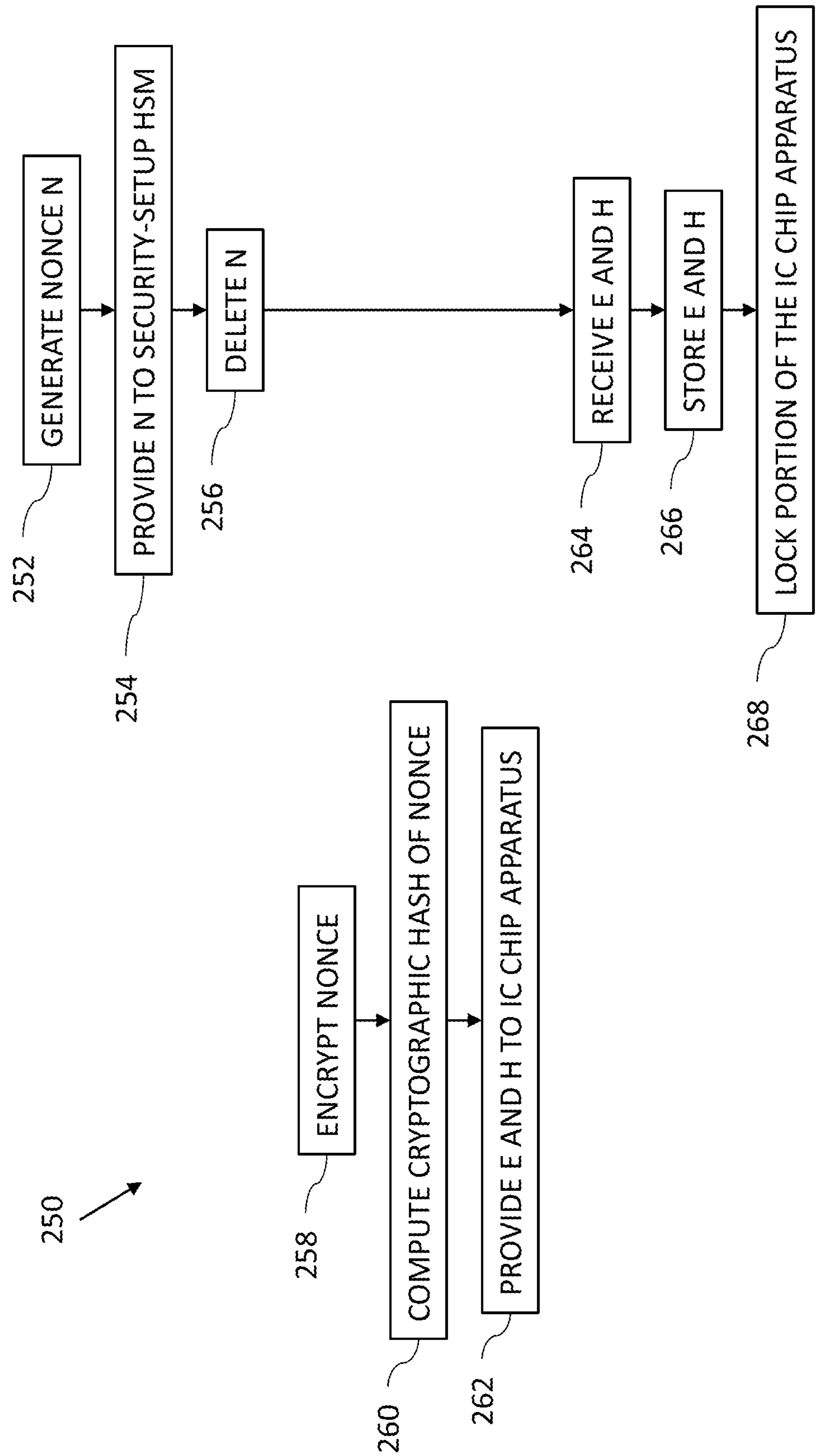
FIG. 6 is a flowchart including steps in a method of operation of the system of FIG. 5.

An alternative chip-security setup process is now described with reference to FIGS. 5 and 6. FIG. 5 is a block diagram view illustrating part of a second alternative integrated circuit (IC) chip security setup system 200 constructed and operative in accordance with an embodiment of the present invention. FIG. 6 is a flowchart 250 including steps in a method of operation of the system 200 of FIG. 5. The system 200 is substantially the same as the IC chip security setup system 10 (FIG. 1) except for the following differences.

Steps performed by the security-setup HSM 14 are shown on the left side of FIG. 6, while steps performed by the IC chip apparatus 26 are shown on the right side of FIG. 6. The chip security circuitry 32 of the IC chip apparatus 26 of FIG. 5 also includes random number generator 37.

The random number generator 37 is configured to randomly generate (block 252) a nonce N. The chip security circuitry 32 of the IC chip apparatus 26 is configured to provide (block 254) the nonce N to the interface 18 of the security-setup HSM 14 via the interface 30 of the IC chip apparatus 26. The chip security circuitry 32 is configured to delete (erase) (block 256) the nonce N from memory (e.g., from the memory 28 and any cache memory).

The encryption engine 22 of the security-setup HSM 14 is configured to encrypt (block 258) the nonce N yielding an encrypted value E. In some embodiments, the encryption engine 22 is configured to encrypt the nonce N using symmetric encryption based on a secret key. In other embodiments, the encryption engine 22 is configured to encrypt the nonce N responsively to a public key of an unlocking HSM, described in more detail with reference to FIGS. 9 and 10.

The hash circuitry 20 of the security-setup HSM 14 is configured to compute (block 260) a cryptographic hash of the nonce N yielding a cryptographic hash value H.

The processor 16 of the security-setup HSM 14 is configured to provide (block 262) the encrypted value E and the cryptographic hash value H to the IC chip apparatus 26 via the interface 18 of the security-setup HSM 14. The chip security circuitry 32 of the IC chip apparatus 26 is configured to receive (block 264) the encrypted value E and the cryptographic hash value H from the interface 18 of the security-setup HSM 14 via the interface 30 of the IC chip apparatus 26. The memory 28 is configured to store (block 266) the encrypted value E and the cryptographic hash value H. The chip security circuitry 32 is configured to lock (block 268) the secured portion 34 of the IC chip apparatus 26 from use. The chip security circuitry 32 may lock the secured portion 34 after performing the steps of blocks 252-266 or prior to the steps of blocks 252-266, for example, the IC chip apparatus 26 may be manufactured in a locked state.

Figure 7:
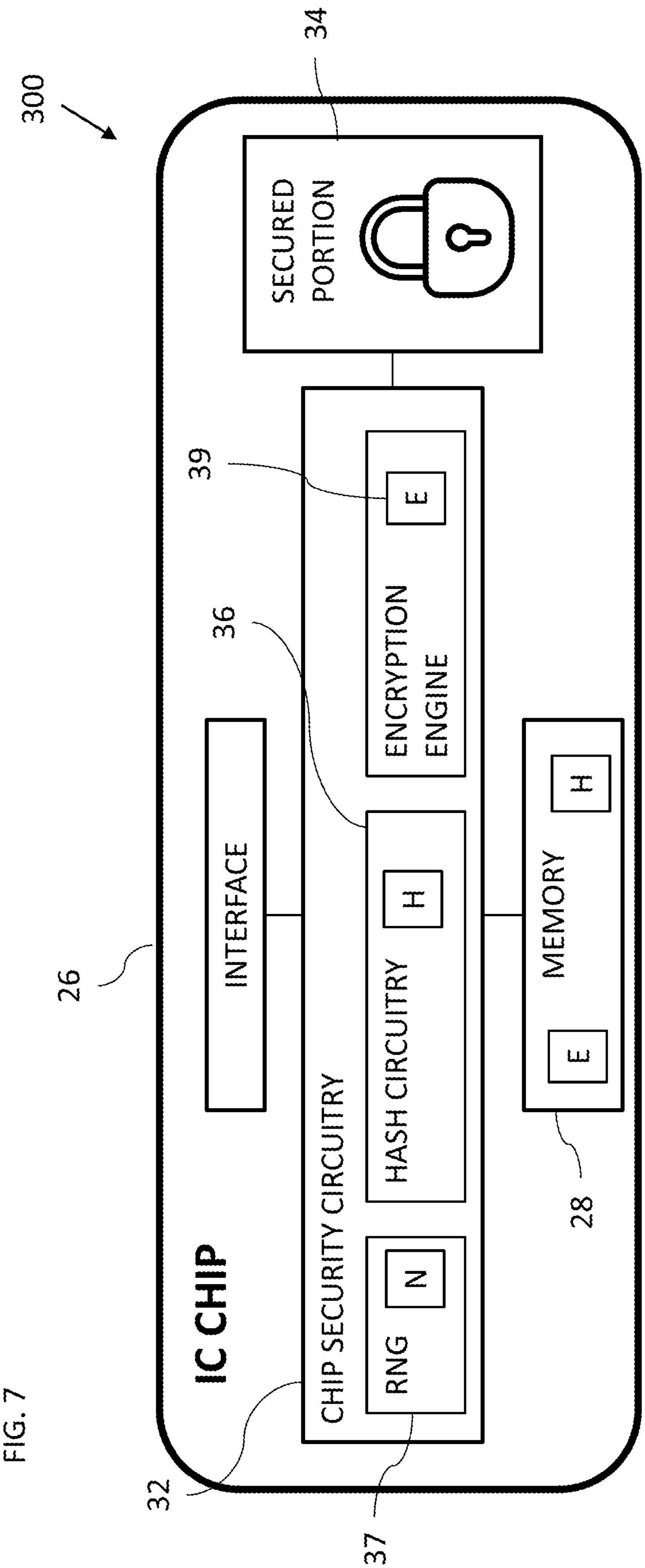
FIG. 7 is a block diagram view illustrating part of a third alternative integrated circuit (IC) chip security setup system constructed and operative in accordance with an embodiment of the present invention.
Figure 8:
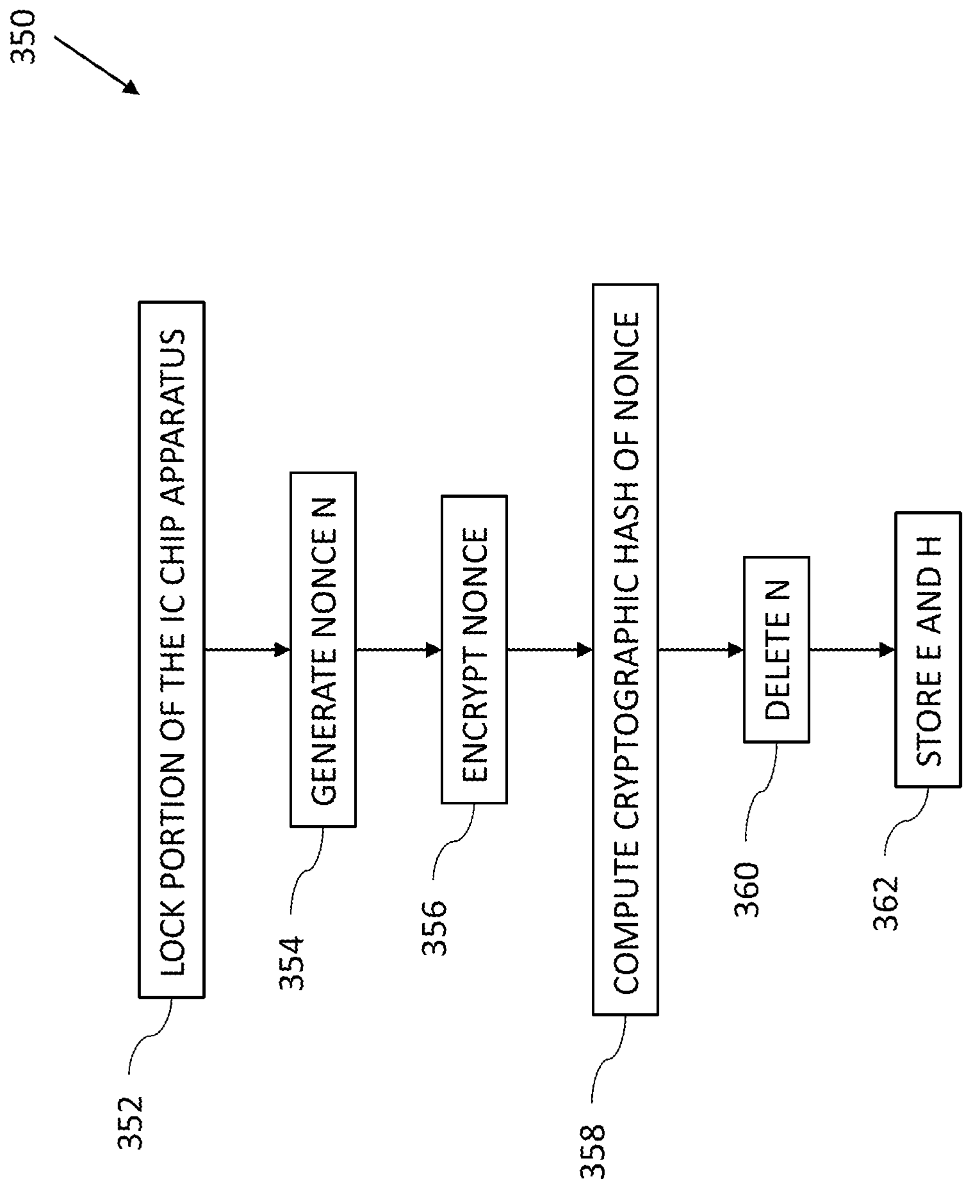
FIG. 8 is a flowchart including steps in a method of operation of the system of FIG. 7.

An alternative chip-security setup process is now described with reference to FIGS. 7 and 8. Reference is now made to FIGS. 7 and 8. FIG. 7 is a block diagram view illustrating part of a third alternative integrated circuit (IC) chip security setup system 300 constructed and operative in accordance with an embodiment of the present invention. FIG. 8 is a flowchart 350 including steps in a method of operation of the system 300 of FIG. 7. The chip security circuitry 32 of the IC chip apparatus 26 of FIG. 7 also includes an encryption engine 39.

The chip security circuitry 32 is configured to lock (block 352) the secured portion 34 of the IC chip apparatus 26 from use. The chip security circuitry 32 may lock the secured portion 34 at any suitable time, for example, after performing the steps of blocks 354-362 or prior to the steps of blocks 354-362, for example, the IC chip apparatus 26 may be manufactured in a locked state. The steps of blocks 354 to 362 may be performed as part of the production process or as part of the unlocking process (in which the step of block 362 is optional) in response to receiving an unlock request, as described in more detail with reference to FIGS. 9 and 10.

The random number generator 37 is configured to randomly generate (block 354) a nonce N. The encryption engine 39 is configured to encrypt (block 356) the nonce N yielding an encrypted value E. In some embodiments, the encryption engine 39 is configured to encrypt the nonce N using symmetric encryption based on a secret key. In other embodiments, the encryption engine 39 is configured to encrypt the nonce N responsively to a public key of an unlocking HSM, described in more detail with reference to FIGS. 9 and 10. The hash circuitry 36 is configured to compute (block 358) a cryptographic hash of the nonce N yielding a cryptographic hash value H. The chip security circuitry 32 is configured to delete (erase) (block 360) the nonce N from memory (e.g., from the memory 28 and any cache memory). The memory 28 is configured to store (block 362) the encrypted value E and the cryptographic hash value H.

Figure 9:
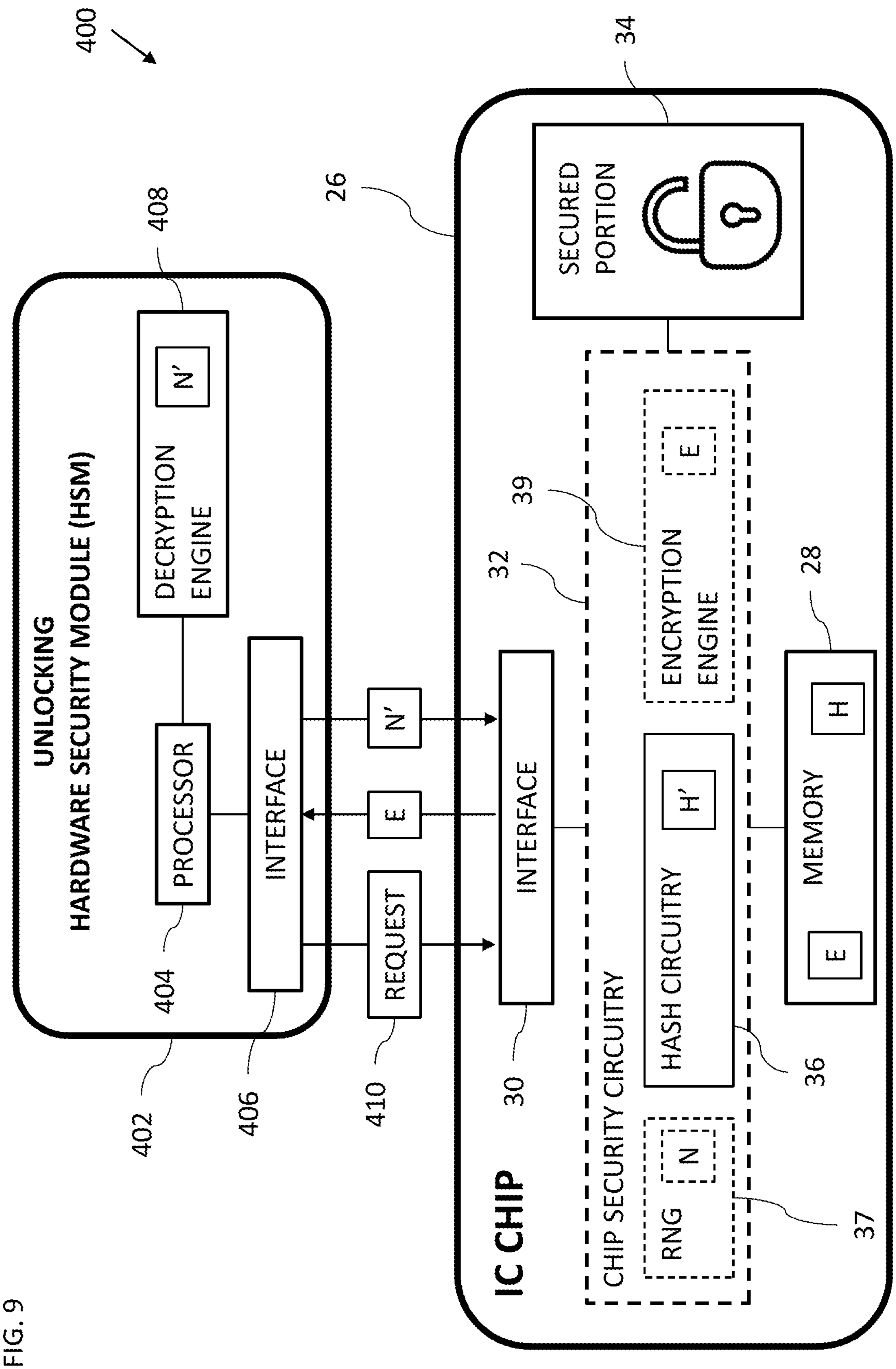
FIG. 9 is a block diagram view illustrating part of an integrated circuit (IC) chip security unlocking system constructed and operative in accordance with an embodiment of the present invention.
Figure 10:
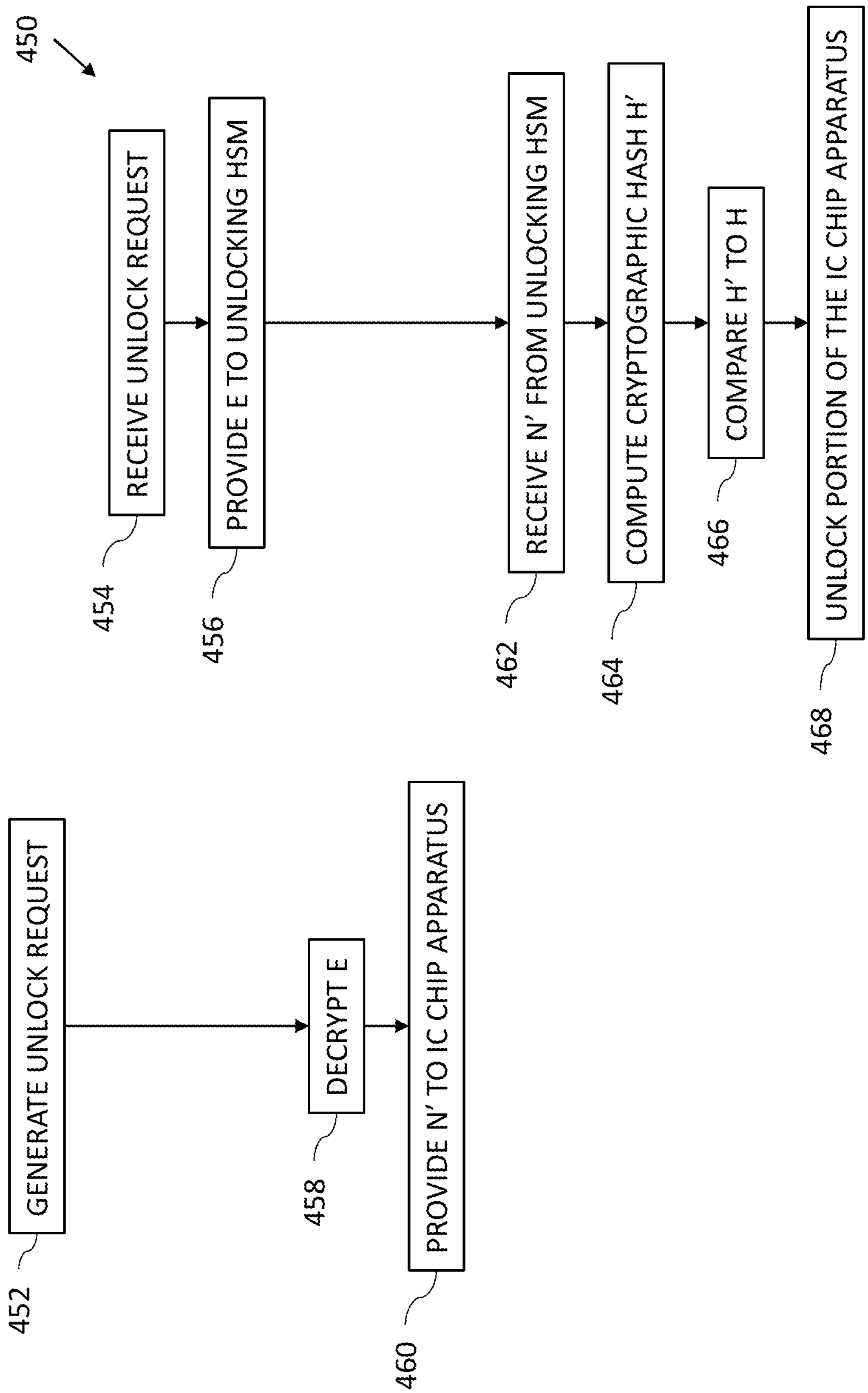
FIG. 10 is a flowchart including steps in a method of operation of the system of FIG. 10.

Reference is now made to FIGS. 9 and 10. FIG. 9 is a block diagram view illustrating part of an integrated circuit (IC) chip security unlocking system 400 constructed and operative in accordance with an embodiment of the present invention. FIG. 10 is a flowchart 450 including steps in a method of operation of the system of FIG. 10.

The integrated circuit (IC) chip security unlocking system 400 includes an unlocking HSM 402, which includes a processor 404, an interface 406 and a decryption engine 408. The unlocking HSM 402 is generally maintained and operated by the IC chip owner (e.g., IC chip designer and/or IP-rights owner) or IC chip vendor. It should be noted that in some embodiments, the unlocking HSM 402 and the security-setup HSM 14 may operate in different geographical locations.

The processor 404 is configured to perform general processing tasks including managing transfer of data among the elements of the unlocking HSM 402 as well as between external devices via the interface 406. The interface 406 is configured to transfer data between external devices, e.g., IC chips, using any suitable wired and/or wireless communication protocol. In some embodiments, the functionality of the decryption engine 408 may be incorporated into the processor 404. In other embodiments, the decryption engine 408 may be implemented using suitable processing circuitry, which may be hard-wired and/or a programmable device.

In practice, some or all of the functions of the processor 404 may be combined in a single physical component or, alternatively, implemented using multiple physical components. These physical components may comprise hard-wired or programmable devices, or a combination of the two. In some embodiments, at least some of the functions of the processor 404 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The IC chip apparatus 26 shown in FIG. 9 also shows the random number generator 37 and encryption engine 39. The random number generator 37 and the encryption engine 39 are generally not used as part of the unlock process unless generation of the hash value H and the encrypted value E is performed in response to an unlock request. In some embodiments, the IC chip apparatus 26 does not include the random number generator 37 and the encryption engine 39.

The unlock process is now described below. Steps performed by the unlocking HSM 402 are shown on the left side of FIG. 10, while steps performed by the IC chip apparatus 26 are shown on the right side of FIG. 10.

The processor 404 of the unlocking HSM 402 is configured to generate (block 452) an unlock request 410. The processor 404 is configured to provide the unlock request 410 to the IC chip apparatus 26 via the interface 406.

The chip security circuitry 32 of the IC chip apparatus 26 is configured to receive (block 454) the unlock request 410 from the unlocking HSM 402 via the interface 30 of the IC chip apparatus 26.

In some embodiments, the IC chip apparatus 26 is configured to generate the encrypted value E and the hash value H responsively to receiving the unlock request 410, as described in more detail with reference to FIGS. 7 and 8, and store the encrypted value E and the hash value H in the memory 28, which may be configured as cache memory, or OTP memory, or non-volatile memory (e.g., flash memory).

The chip security circuitry 32 of the IC chip apparatus 26 is configured to provide (block 456) the stored encrypted value E (stored in the memory 28) to the unlocking HSM 402 via the interface 30, responsively to the unlock request 410.

The processor 404 is configured to receive the encrypted value E via the interface 406 and pass the encrypted value E to the decryption engine 408 for decryption. The decryption engine 408 of the unlocking HSM 402 is configured to decrypt (block 458) the encrypted value E yielding a value N'.

In some embodiments, the decryption engine 408 is configured to decrypt the encrypted value E using symmetric encryption based on the secret key used to encrypt the nonce N yielding the encrypted value E. In other embodiments, the decryption engine 408 is configured to decrypt the encrypted value E responsively to a private key of the unlocking HSM 402.

The processor 404 is configured to provide (block 460) the value N' to the IC chip apparatus 26 via the interface 406. The chip security circuitry 32 of the IC chip apparatus 26 is configured to receive (block 462) the value N' from unlocking HSM 402 via the interface 30.

The hash circuitry 36 of the chip security circuitry 32 is configured to compute (block 464) a cryptographic hash value H' responsively to the value N' (e.g., compute a cryptographic hash of the value N'). The hash circuitry 36 may use any suitable cryptographic hash algorithm, for example, but not limited to, MD5 or SHA-1, SHA-2, or SHA-3.

The chip security circuitry 32 is configured to compare (block 466) the cryptographic hash value H' to the stored cryptographic hash value H (stored in the memory 28). The chip security circuitry 32 is configured to unlock (block 468) the secured portion 34 of the IC chip apparatus 32 for use, responsively to finding a match between the hash value H' and the hash value H. The secured portion 34 may remain unlocked until relocked or until a given timeout expires.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A secure integrated circuit (IC) chip apparatus, comprising:

a memory configured to store an encrypted value E of a nonce N and a one-way function output-value H, which is an output value of a one-way function computed with the nonce N as input;

an interface configured to transfer data with an external device; and chip security circuitry configured to:

lock a portion of the IC chip apparatus from use;

receive an unlock request from an unlocking hardware security module (HSM) via the interface;

provide the encrypted value E to the HSM via the interface responsively to the unlock request;

receive a value N' from the HSM, the value N' being a decrypted value of the encrypted value E;

compute a one-way function output-value H' responsively to the value N';

compare the one-way function output-value H' to the one-way function output-value H; and unlock the portion of the IC chip apparatus for use responsively to a match between the value H' and the value H.

2. The apparatus according to claim 1, further comprising a random number generator to generate the nonce N, the chip security circuitry being configured to: provide the nonce N to a security-setup HSM; receive the encrypted value E and the one-way function output-value H from the security-setup HSM; and delete the nonce N.

3. The apparatus according to claim 1, further comprising a random number generator to generate the nonce N, the chip security circuitry being configured to: compute the one-way function output-value H responsively to the nonce N; provide the nonce N to a security-setup HSM; receive the encrypted value E from the security-setup HSM; and delete the nonce N.

4. The apparatus according to claim 1, further comprising a random number generator to generate the nonce N, the chip security circuitry being configured to: encrypt the nonce N yielding the encrypted value E; compute the one-way function output-value H responsively to the nonce N; and delete the nonce N.

5. The apparatus according to claim 1, wherein the chip security circuitry is configured to receive the encrypted value E and the one-way function output-value H from a security-setup HSM.

6. The apparatus according to claim 1, wherein the portion of the IC chip apparatus comprises a debug interface.

7. A secure integrated circuit (IC) chip method, comprising:

performing a chip-security setup process, comprising:

storing an encrypted value E of a nonce N and a one-way function output-value H, which is an output value of a one-way function computed with the nonce N as input, in a memory of an IC chip apparatus; and locking a portion of the IC chip apparatus from use; and performing an unlock process by the IC chip apparatus, comprising:

receiving an unlock request from an unlocking hardware security module (HSM) via an interface;

providing the encrypted value E to the HSM via the interface responsively to the unlock request;

receiving a value N' from the HSM, the value N' being a decrypted value of the encrypted value E;

computing a one-way function output-value H' responsively to the value N';

comparing the one-way function output-value H' to the one-way function output-value H; and unlocking the portion of the IC chip apparatus for use responsively to a match between the value H' and the value H.

8. The method according to claim 7, wherein the chip-security setup process further comprises the IC chip apparatus:

randomly generating the nonce N;

providing the nonce N to a security-setup HSM;

receiving the encrypted value E and the one-way function output-value H from the security-setup HSM; and deleting the nonce N.

9. The method according to claim 7, wherein the chip-security setup process further comprises the IC chip apparatus:

randomly generating the nonce N;

computing the one-way function output-value H responsively to the nonce N;

providing the nonce N to a security-setup HSM;

receiving the encrypted value E from the security-setup HSM; and deleting the nonce N.

10. The method according to claim 7, wherein the chip-security setup process further comprises the IC chip apparatus:

randomly generating the nonce N;

encrypting the nonce N yielding the encrypted value E;

computing the one-way function output-value H responsively to the nonce N; and deleting the nonce N.

11. The method according to claim 7, wherein the chip-security setup process further comprises the IC chip apparatus receiving the encrypted value E and the one-way function output-value H from a security-setup HSM.

12. A secure integrated circuit (IC) chip method, comprising:

performing a chip-security setup process, comprising:

storing an encrypted value E and a one-way function output-value H, which is an output value of a one-way function computed with a nonce N as input, in a memory of an IC chip apparatus; and locking a portion of the IC chip apparatus from use; and performing an unlock process, comprising:

generating an unlock request by an unlocking hardware security module (HSM);

providing, by the IC chip apparatus, the stored encrypted value E to the HSM responsively to the unlock request;

decrypting the encrypted value E by the HSM yielding a value N';

providing, by the HSM, the value N' to the IC chip apparatus;

computing, by the IC chip apparatus, a one-way function output-value H' responsively to the value N';

comparing, by the IC chip apparatus, the one-way function output-value H' to the stored one-way function output-value H; and unlocking, by the IC chip apparatus, the portion of the IC chip apparatus for use, responsively to a match between the value H' and the value H.

13. The method according to claim 12, wherein the chip-security setup process further comprises:

randomly generating the nonce N by the IC chip apparatus;

providing, by the IC chip apparatus, the nonce N to a security-setup HSM;

encrypting the nonce N and computing the one-way function with the nonce N as input by the security-setup HSM yielding the encrypted value E and the one-way function output-value H, respectively;

providing the encrypted value E and the one-way function output-value H to the IC chip apparatus; and deleting the nonce N from the IC chip apparatus.

14. The method according to claim 13, wherein:

the encrypting comprises encrypting the nonce N responsively to a public key of the unlocking HSM; and the decrypting comprises decrypting the encrypted value E responsively to a private key of the unlocking HSM.

15. The method according to claim 12, wherein the chip-security setup process further comprises:

randomly generating the nonce N by the IC chip apparatus;

computing, by the IC chip apparatus, the one-way function output-value H responsively to the nonce N;

providing, by the IC chip apparatus, the nonce N to a security-setup HSM;

encrypting the nonce N by the security-setup HSM yielding the encrypted value E;

providing the encrypted value E to the IC chip apparatus; and deleting the nonce N from the IC chip apparatus.

16. The method according to claim 15, wherein:

the encrypting comprises encrypting the nonce N responsively to a public key of the unlocking HSM; and the decrypting comprises decrypting the encrypted value E responsively to a private key of the unlocking HSM.

17. The method according to claim 12, wherein the chip-security setup process further comprises:

encrypting the nonce N and computing the one-way function with the nonce N as input by a security-setup HSM yielding the encrypted value E and the one-way function output-value H, respectively; and providing the encrypted value E and the one-way function output-value H to the IC chip apparatus.

18. The method according to claim 17, wherein:

the encrypting comprises encrypting the nonce N responsively to a public key of the unlocking HSM; and the decrypting comprises decrypting the encrypted value E responsively to a private key of the unlocking HSM.

19. The method according to claim 12, wherein the chip-security setup process further comprises performing by the IC chip apparatus:

randomly generating the nonce N by the IC chip apparatus;

encrypting the nonce N yielding the encrypted value E;

computing the one-way function with the nonce N as input yielding the one-way function output-value H; and deleting the nonce N from the IC chip apparatus.

20. The method according to claim 19, wherein:

the encrypting comprises encrypting the nonce N responsively to a public key of the unlocking HSM; and the decrypting comprises decrypting the encrypted value E responsively to a private key of the unlocking HSM.

* * * * *